3,686,140
POLYURETHANE CASTING RESINS CONTAINING ARYL OXYALKANOLS

Hermann Gruber, Leverkusen, and Robert Schmitz-Josten, Cologne-Stammheim, Germany, assignors to Farbenfabriken Bayer Aktiengesellschaft, Leverkusen, Germany
No Drawing. Filed Oct. 13, 1970, Ser. No. 80,498
Claims priority, application Germany, Oct. 17, 1969,
P 19 52 395.6
Int. Cl. C08g 22/16
U.S. Cl. 260—47 CB                    6 Claims

ABSTRACT OF THE DISCLOSURE

Solvent-free polyurethane casting resins are prepared by mixing a polyisocyanate with a mixture consisting of an hydroxyl-containing polyol and an aryloxyalkanol. These resins are especially suited for use as fillers and for the manufacture of molded articles.

---

This invention relates to polyurethane casting resins and more particularly to polyurethane casting resins prepared from the addition reaction of polyisocyanates with a mixture of mono- and polyvalent alcohols.

Casting resins, prepared by the addition reaction of polyisocyanates and polyalcohols, which are suitable for the production of coatings and grouting compositions are well known in the art.

Polyurethane coating compounds are generally prepared from raw materials which contain solvents, but if drying agents such as molecular sieve zeolites are introduced it is also possible to produce solvent-free coatings based on polyurethanes. The drying agent inhibits the troublesome side reaction of the polyisocyanate with water. Polyurethane coatings of this type are used, for example, for painting the inside surfaces of containers. Floor coverings which are required in the form of a very thick, resistant coating in a single application are also produced using polyurethane systems which are free from solvents.

Furthermore, it is well known from polyurethane chemistry that effective catalysts are available which substantially accelerate the reaction between polyisocyanates and polyalcohols. With the aid of these catalysts, casting resins which harden very rapidly can be prepared simply by mechanically mixing the reactants. Since the reactants can be worked up without solvents and only a minimum amount of shrinkage is observed during the hardening process, the resins are particularly suitable for filling cracks and cavities. The products are worked up by methods commonly employed for producing casting resins, such as for example, mechanical devices may be used by which the reactants may be mixed and cast, if desired, under reduced pressure. Separate parts made of polyurethane may be produced in this way using suitable molds and also similar or different parts may be bonded together. Polyurethane raw materials which are free from solvents are used in the electrical industry, for example, for embedding electrical parts, for sealing the ends of cables and for producing homogeneously soldered accumulators. In the building industry, for example, grouting compositions based on polyurethanes are of considerable interest particularly due to their high elasticity.

Various conditions must be met if the polyurethane raw materials are to be suitable for the purposes hereinabove described. One of the most important conditions is that the reactive components have a sufficiently low viscosity, this means viscosities of 5,000 to 20,000 centipoises at 20° C. Low viscosity in the polyurethane raw materials is advantageous first because coatings with superior levelling properties are obtained and second because the casting resins obtained are easier to work up. Another advantage of low viscosity casting resins and coating raw materials is that greater quantities of fillers and blending agents such as, for example, quartz sand, heavy spar, chalk, and the like may be added to the reaction mixture.

The advantages of low viscosity are recognized, for example, in preparing casting resin raw materials based on epoxide resins. So-called "reactive diluents" are used in epoxide resin chemistry for the purpose of reducing the viscosity of epoxide resins. These diluents are, in most instances, monofunctional low molecular weight epoxide compounds which are added to the actual epoxide resins. In practice, phenyl glycidyl ethers or alkyl glycidyl ethers, such as butyl glycidyl ether are used mainly which, owing to their low viscosity, substantially improve the working up of solvent-free epoxide resins (H. Lee, K. Neville Handbook of epoxy resins, McGraw-Hill Book Company, New (1967)). However, this decrease in viscosity is accompanied by a decrease in mechanical properties. For example, epoxide resins containing monofunctional low molecular epoxide compounds which have been hardened and cross-linked with polyamines, will be inferior to those of pure bifunctional epoxide resins. A deterioration is also found in the resistance of the lower viscosity resins to corrosive chemicals.

The principle of reactive diluents has not hitherto been used in relation to liquid resins which are used for producing solvent-free polyurethane resins. The primary reason for this is the insufficient compatibility of the usual mono-functional alcohols with polyurethane raw materials.

It is therefore an object of this invention to provide a method of preparing solvent-free polyurethane casting resins. It is another object of this invention to provide solvent-free polyurethane casting resins of low viscosity. It is a further object of this invention to prepare solvent-free polyurethane casting resins by employing the principle of "reaction diluents."

The foregoing objects and others which will become apparent from the following description are accomplished in accordance with the invention, generally speaking, by providing a mixture of a polyisocyanate and a hydroxyl containing component, the latter consisting of from about 1 percent to about 30 percent by weight of a monovalent alcohol and from about 99 percent to about 70 percent of an hydroxyl containing polyol. The monovalent alcohols which function in much the same manner as a reactive diluent and which can be successfully used in a polyurethane system according to the invention are aryl oxyalkanols which are generally obtained by the etherification of phenol or substituted phenols with bifunctional alcohols or by the reaction of alkylene oxides with phenols in the presence of catalysts or by heating. In contrast to the generally employed reactive diluents or monofunctional alcohols, the aryl oxyalkanols are not only compatible, i.e., clearly miscible, with polyisocyanates but also result in a polyurethane casting resin having demonstrably improved mechanical properties, provided the aryl oxyalkanol does not exceed about 30 percent by weight of the combined weight of the aryl oxyalkanol/hydroxyl-containing polyol mixture.

Any aryl oxyalkanols having a molecular weight of from about 138 to about 500 are suitable for use as reactive diluents. Some suitable starting materials for the preparation of aryl oxyalkanols are for example phenol, o-, m- and p-cresol, cresol mixtures, isomeric xylenols, 2-sec-butylphenol, 4-tertiary-butylphenol, 4-cyclohexylphenol, 4-nonylphenol mixtures containing branched nonyl radicals, dodecylphenol mixtures which can be prepared for example, by the addition of suitable olefins to phenols in the presence of Friedel-Crafts catalysts, amyl-hexyl-heptylphenol, chlorinated or modified phenols, 4-hydroxybenzoic acid esters and the like. The preparation of the aryl oxyalkanols from the above mentioned phenols is advantageously carried out by reacting them with compounds which contain epoxide groups, such as, for example, ethylene oxide, propylene oxide, butylene oxide and the like. Alternatively, the phenols may be etherified with alkanediols. The preparation of aryloxyalkanols is e.g. described in Houben Weyl, voluve VI/13, p. 80; Journal of the American Chemical Society, volume 70 (1948), page 3606; Journal of the American Chemical Society, volume 62 (1940), p. 994. Preferred aryloxyalkanols are those of the general formula:

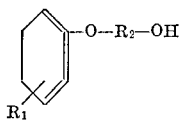

in which $R_1$ stands for hydrogen or a $C_1$–$C_{12}$-alkyl radical and $R_2$ stands for a $C_2$–$C_4$-alkylene radical. Specific examples are 2-phenoxyethanol, 2-phenoxy-propanol, 3-phenoxy-propanol, 2-phenoxybutanol, 4-phenoxy-butanol, 2 - (4-methylphenoxy)ethanol, 2-(4-butylphenoxy)-propanol, 3 - (2-hexylphenoxy)-propanol, 4-(3-dodecylphenoxy)-butanol, etc.

A number of different compounds containing hydroxyl groups reactive with —NCO groups are suitable for use as polyols for the preparation of the mixtures which are used according to the invention. Preferred polyols are those having a molecular weight of from 250 to 10000 most preferred are those having a molecular weight of from 600 to 5000. Examples of such compounds include polyether polyols, such as, for example, those which are obtained by anionic polymerization, copolymerization and block copolymerization of alkylene oxides, such as, for example, ethylene oxide, propylene oxide or butylene oxide with bi functional or polyfunctional alcohols, such as, for example, butane-1,4-diol, 1,1,1-trimethylolethane, 1,1,1-trimethylolpropane, hexane,1,2,6-triol, glycerol, pentaerythritol and sorbitol or their alkali metal alcoholates or with amines, such as, for example, methylamine, ethylene diamine and 1,6-hexamethylene diamine as initiators, or by cationic polymerization or copolymerization of cyclic ethers, such as, for example, tetrahydrofuran, ethylene oxide or propylene oxide with acid catalysts, such as, for example, boron trifluoride etherate, or by polycondensation of glycols which are polycondensable with the elimination of water, such as, for example, hexane-1,6-diol, in the presence of acid etherification catalysts, such as, for example, p-toluene sulphonic acid. Oxalkylation products of phosphoric acid or phosphorous acid with, for example, ethylene oxide, propylene oxide, butylene oxide or styrene oxide are also suitable. The flame-protective effect of such compounds which contain phosphorus is of particular note.

Polythioether polyols, such as, for example the polycondensation products of thiodiglycol with itself or with polyols, such as, for example, hexane-1,6-diol, triethylene glycol, 2,2-dimethyl-propane-1,3-diol and 1,1,1-trimethylolpropane may also be used. Polyacetals, particularly the polycondensation products of formaldehyde and polyols, such as, for example, diethylene glycol, trimethylene glycol, butane-1,4-diol, hexane-1,6-diol or 1,1,1-trimethylolpropane, are also suitable.

Polyester polyols, such as, for example, the condensation products of polycarboxylic acids and polyols, for example, adipic acid, phthalic acid, tetrahydrophthalic acid, hexahydrophthalic acid and endomethylene tetrahydrophthalic acid with ethylene glycol, butane-1,4-diol, diethylene glycol, triethylene glycol, hexane-1,6-diol, 2,2-dimethylpropane-1,3-diol, 1,1,1-trimethylolpropane or hexane-1,2,6-triol as well as polycarbonates of the above mentioned polyols or polymerization products of lactones such as ε-caprolactone are also suitable.

Polyester amides such as, for example, polycondensation products of polycarboxylic acids and amino alcohols or mixtures of amino alcohols and polyamines or of aminocarboxylic acids with polyols may also be used for the preparation of the mixtures to be used according to the invention. Hydroxyl-containing natural substances such as castor oil and hydroxyl-containing synthetic resins such as the condensation products of formaldehyde and ketones such as, for example, cyclohexanone are also suitable. Products obtained by boiling or ester interchange of the above mentioned materials may also be used.

Particularly preferred for the preparation of the mixtures to be used according to the invention are those polyisocyanates which contain more than two isocyanate groups in the molecule. These include, for example, the reaction products of toluylene diisocyanate with trimethylolpropane or other polyhydric alcohols or isocyanates such as those obtained by phosgenation of the condensation products of aniline and formaldehyde. Aliphatic biuret polyisocyanates which can be obtained by reacting hexamethylene diisocyanate with water or with compounds which eliminate water may also be used. Trimerization and polymerization products of for example, toluylene diisocyanate, mixed trimerization and copolymerization products of toluylene diisocyanate and hexamethylene diisocyanate, polyisocyanates which contain more than two benzene nuclei linked by methane groups, and diisocyanates which have a diphenylmethane structure in which the isocyanate groups are partly converted into carbodiimide groups are also suitable.

The polyisocyanates contemplated for use according to the process of the invention are those isocyanates which contain at least two —NCO groups per molecule and may be aliphatic or preferably aromatic isocyanates. The polyisocyanates may also be substituted by various substituted by various substituents, such as, for example, halogen atoms, particularly chlorine, bromine, fluorine and iodine, or alkoxyl or nitro groups. Some suitable polyisocyanates suitable for use according to the process of the invention are 1-chlorobenzyl-2,4-diisocyanate,
1-nitrobenzyl-2,4-diisocyanate,
1,3-dichlorobenzyl-4,6-diisocyanate,
1,4-dichlorobenzyl-2,5-diisocyanate,
1-chloro-4-methoxybenzyl-2,5-diisocyanate,
1-methoxybenzyl-2,4-diisocyanate,
1-methyl-4-methoxybenzyl-2,5-diisocyanate,
1-ethoxybenzyl-2,4-diisocyanate,
1,3-dimethoxybenzyl-4,6-diisocyanate,
1,4-dimethoxybenzyl-2,5-diisocyanate,
1-propoxybenzyl-2,4-diisocyanate,
1-isobutoxybenzyl-2,4-diisocyanate,
1,4-diethoxybenzyl-2,5-diisocyanate,
toluene-2,4-diisocyanate,
toluene-2,6-diisocyanate,
diphenylether-2,4-diisocyanate,
naphthalene-1,4-diisocyanate,
1,1'-dinaphthalene-2,2'-diisocyanate,
biphenyl-2,4-diisocyanate,
3,3'-dimethylbiphenyl-4,4'-diisocyanate,
3,3'-dimethoxybiphenyl-4,4'-diisocyanate,
diphenylmethane-4,4'-diisocyanate,
diphenylmethane-2,4'-diisocyanate,
diphenylmethane-2,2'-diisocyanate,
3,3'-dimethoxydiphenylmethane-4,4'-diisocyanate,
3,3'-dichlorodiphenyldimethylmethane-4,4'-diisocyanate,
benzophenone-3,3'-diisocyanate.

Further examples of such compounds include ethylene diisocyanate,
propylene diisocyanate,
butylene diisocyanate,
pentylene diisocyanate, methylbutylene diisocyanate,
tetramethylene diisocyanate,
pentamethylene diisocyanate,
hexamethylene diisocyanate,
dipropyldiisocyanato ether,
heptamethylene diisocyanate,
2,2-dimethylpentylene diisocyanate,
3-methoxy-hexamethylene diisocyanate,
otamethylene diisocyanate,
2,2,4-trimethylpentylene diisocyanate,
3-butoxyhexamethylene diisocyanate,
1,3-dimethyl benzene diisocyanate,
1,4-dimethyl benzene diisocyanate,
1,2-dimethylcyclohexane diisocyanate,
1,4-dimethylcyclohexane diisocyanate,
1,4-diethylbenzene diisocyanate,
1,4-dimethylnaphthalene diisocyanate,
1,5-dimethylnaphthalene diisocyanate,
1-methylisocyanate-2-n-propylisocyanate,
3,5-dimethylcyclohexane,
cyclohexane-1,3-diisocyanate,
cyclohexane-1,4-diisocyanate,
1-methylcyclohexane-2,4-diisocyanate,
1-methylcyclohexane-2,2-diisocyanate,
1-ethylcyclohexane-2,4-diisocyanate,
dicyclohexylmethane-4,4'-diisocyanate,
dicyclohexylmethylmethane-4,4'-diisocyanate,
dicyclohexyldimethylmethane-4,4'-diisocyanate,
2,2-dimethyldicyclohexylmethane-4,4'-diisocyanate,
3,3'-5,5'-tetramethyldicyclohexylmethane-4,4'-diisocyanate,
4-phenylisocyanatemethylisocyanate,
3-nitrotriphenylmethane-4,4'-diisocyanate,
pyrene-3,8-diisocyanate,
chrysene-2,8-diisocyanate,
naphthalene-1,3,7-triisocyanate,
diphenylmethane-2,4,4-triisocyanate,
3-methyldiphenylmethane-4,6,4'-triisocyanate,
4,4'-dimethyldiphenylmethane-2,2',5,5'-tetraisocyanate,
triphenylmethane-4,4',4"-triisocyanate, and
diphenyl-4,4'-diisocyanate-N-carbamyl acid chloride,
2,4,4'-triisocyanato diphenyl ether,
2,4,6-triisocyanato-1-methyl-3,5-diethyl benzene,
tri(p-isocyanato phenyl)-thiophosphate,
tri(p-isocyanato phenyl),
phosphate,
p-xylene-diisocyanate,
n-xylene diisocyanate and the like.

The amount of reactive diluent or aryloxyalkanol contained in the mixtures which are to be used according to the invention is generally from about 1 to about 30 and preferably from about 5 percent to about 20 percent by weight based on the total weight of polyol and monofunctional alcohol. The equivalent ratio of isocyanate groups to active hydrogen atoms is maintained at from about 0.6 to about 1.4 and preferably from about 0.8 to about 1.2 in the mixtures which are ready for use. The usual catalysts used in polyurethane chemistry, such as, for example, diazabicyclooctane, dibutyltin dilaurate and tin-II-octoate as well as fillers and pigments such as, for example, quartz sand, quartz powder, kaolin, talcum, chalk, asbestos sand, titanium dioxide, chromium oxide, iron oxide and the like may also be included. Plasticizers which may be added in the preparation of the products of the process include, for example, phthalates such as dibutyl phthalate, phosphates such as tricresyl phosphate and chlorinated diphenyls.

Hardening of the mixture used according to the invention is generally carried out at room temperature, although the rate of hardening may be increased by employing elevated temperatures. The components may be mixed by stirring them by hand or mechanically. Mechanical mixing is advisable particularly if a continuous process is envisaged.

The mixtures used according to the invention may be applied by casting, spraying, painting, knife coating and trowelling, using the customary tools and machines.

The mixtures described may be used advantageously for the production of polyurethane flooring coatings. For this purpose, fillers are incorporated into the liquid polyalcohol of low viscosity by means of mixing tools or if non-slip coatings are to be produced, for example, for ships' decks, the granular fillers are scattered into the coating compound when it is still liquid. The mixture according to the invention is also suitable for the production of low viscosity casting resins for the electrical industry. Of the many different possibilities of using the mixtures, their use for sealing the ends of cables may be particularly mentioned. In this case, the low viscosity casting resin is used to prevent penetration of water into the interior of the electrical parts. The firm bond obtained with the mixture according to the invention on plastic and rubber cable sheathes is of particular advantage in this case. Surface fillers based on polyurethane raw materials may also advantageously contain aryl oxyalkanols. This makes the fillers less tough and easier to use.

The invention is further described but it is not intended that it be limited by the following examples in which all parts and percentages are by weight unless otherwise specified.

EXAMPLE 1

Dependence of the viscosity of a polyether ester polyol on the 2-phenoxyethanol content:

Preparation of a polyalcohol component of low viscosity:

About 1000 parts of a polyester compound of triethylene glycol, trimethylolpropane and adipic acid having an average molecular weight of about 1200 and an OH content of about 5 percent by weight and an initial viscosity of about 5150 cp./120° C. are in each case thoroughly mixed with about 5, 10, 15, 20 and 25 percent by weight of 2-phenoxyethanol, respectively, based on the total quantity of monophenyl glycol.

The mixtures are subjected to a viscosity test and the following values are obtained at 20° C.:

| Percent 2-phenoxyethanol: | Centipoises |
|---|---|
| 0 | 5150 |
| 5 | 3510 |
| 10 | 2250 |
| 15 | 1650 |
| 20 | 1180 |
| 25 | 875 |

EXAMPLE 2

Preparation of a solvent-free coating compound which may be used for casting resins:

About 1000 parts of the polyester compound of Example 1 are mixed with about 100 parts of an approximately 50% suspension of molecular sieve zeolite in castor oil. About 42 parts of a commercial polyisocyanate which has been prepared by phosgenation of an aniline/formaldehyde condensation product and which has an NCO content of about 32 percent and a viscosity of about 115 centipoises are added to this mixture and thoroughly mixed. The mixture remains pourable for about 40 minutes and solidifies within about 24 hours to a cross-linked, insoluble polyurethane resin. In subsequent reaction mixtures, increasing proportions of 2-phenylethanol are added, the proportion of polyisocyanate being also increased in accordance with the hydroxyl group content of the 2-phenoxyethanol. The figures shown in the first part of the following table represent parts by weight and the mechanical properties are shown in the second part of the table.

TABLE

| | | | | | | |
|---|---|---|---|---|---|---|
| Polyester from Example 1 | 100 | 95 | 90 | 85 | 80 | 75 |
| Zeolite (50% in castor oil) | 10 | 10 | 10 | 10 | 10 | 10 |
| Monophenyl glycol | 0 | 5 | 10 | 15 | 20 | 25 |
| Isocyanate | 42 | 45 | 48 | 51 | 54 | 57 |
| Tension at break kg. wt./cm.² | 132 | 162 | 146 | 129 | 114 | 86.5 |
| Elongation at break, percent | 89 | 102 | 124 | 116 | 161 | 207 |
| Shore hardness D | 55 | 54 | 55 | 62 | 63 | 58 |
| Tear propagation resistance kg. wt./cm.² | 45 | 75 | 81 | 83 | | |
| Bond strength on steel kg. wt./cm.² | 115 | 131 | 137 | 156 | 103 | 91 |

The figures show that an improvement in the mechanical properties, particularly the elongation, toughness and bond strength, is obtained by the addition of up to 15% by weight of 2-phenoxyethanol, based on the total amount of hydroxyl-containing compounds.

EXAMPLE 3

Preparation of a casting compound of low viscosity for use in the electrical industry:

About 520 parts of a polyether compound having 11.5% of OH groups (prepared from 1 mol of trimethylolpropane and 6 mols of propylene oxide) are mixed with about 480 parts of castor oil and about 100 parts of an approximately 50 percent suspension of molecular sieve zeolite in castor oil. About 100 parts of 1-phenoxypropanol-(2) are added to reduce the viscosity. About 880 parts of a polyisocyanate containing about 31.5% of NCO which has been prepared by phosgenation of an aniline formaldehyde condensation product are added to make the casting resin suitable for use. In addition, about 480 parts of calcium magnesium carbonate are incorporated as filler, using a mixing apparatus equipped with a vacuum device. The casting resin prepared in this way had a viscosity of about 650 centipoises. It was pourable for about 45 minutes and solidified overnight to a hard polyurethane resin which had the following electrical properties:

Surface resistance:
   VDE 0303/3 ohm, dry _____ $1.2 \times 10^{14}$
Dielectric constant:
   VDE 0303/4 at 20° C. _____ 3.3
Breakdown potential:
   VDE 0303/2 kv./cm. _____ 240
Specific resistance ohm: _____ cm.
   VDE 0303/3 at 20° C. _____ $8 \times 10^{15}$ Although the invention has been illustrated in considerable detail in the foregoing it is to be understood that such detail is solely for the purpose of illustration and that one skilled in the art may make many variations therein without departing from the spirit and scope of the invention.

What is claimed is:

1. In the process of preparing polyurethane casting resins from hydroxyl containing polyols and organic polyisocyanates, the improvement comprising the addition of an aryl oxyalkanol having a molecular weight of from about 138 to about 500 of the general formula

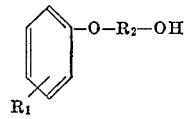

wherein $R_1$ is hydrogen or a $C_1$ to $C_{12}$ alkyl radical and $R_2$ is a $C_2$ to $C_4$ alkylene radical, said aryl oxyalkanol being added in a quantity such that it comprises from about 1 to about 30 percent by weight of the combined weight of polyol and aryl oxyalkanol, while maintaining an equivalent ratio of —NCO groups to active hydrogen atoms of from about 0.6:1 to about 1.4:1.

2. The process of claim 1 wherein the hydroxyl containing polyol is selected from the group consisting of polyethers, polythioethers, polyacetals, polyesters, polyester amides, polycarbonates, polyvalent alcohols and mixtures thereof.

3. The process of claim 1 wherein the polyisocyanate contains more than two —NCO groups in the molecule.

4. The process of claim 1 wherein the polyisocyanate is the polyisocyanate mixture obtained by phosgenation of the condensation product of aniline with formaldehyde.

5. The process of claim 1 wherein the aryl oxyalkanol is 2-phenoxyethanol.

6. The process of claim 1 wherein the aryl oxyalkanol is 1-phenoxypropanol-(2).

References Cited

UNITED STATES PATENTS

| | | | |
|---|---|---|---|
| 3,375,224 | 3/1968 | Condien et al. | 260—47 CB |
| 3,393,177 | 7/1968 | Guest et al. | 260—47 CB |

OTHER REFERENCES

Mesanguy, Chem. Abstracts, 58, p. 8973a, 1963.

DONALD E. CZAJA, Primary Examiner

M. J. WELSH, Assistant Examiner

U.S. Cl. X.R.

260—18 TN, 30.0 R, 31.8 N, 33.8 UB, 37 N, 75 NH, 77.5 MA